(12) United States Patent
Sanae

(10) Patent No.: US 9,764,596 B2
(45) Date of Patent: Sep. 19, 2017

(54) PNEUMATIC TIRE

(71) Applicant: SUMITOMO RUBBER INDUSTRIES, LTD., Kobe-shi, Hyogo (JP)

(72) Inventor: Ryuhei Sanae, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 293 days.

(21) Appl. No.: 14/605,595

(22) Filed: Jan. 26, 2015

(65) Prior Publication Data

US 2015/0210121 A1   Jul. 30, 2015

(30) Foreign Application Priority Data

Jan. 27, 2014  (JP) .................................. 2014-012640

(51) Int. Cl.
  *B60C 11/03* (2006.01)
  *B60C 11/12* (2006.01)

(52) U.S. Cl.
  CPC ...... *B60C 11/0304* (2013.01); *B60C 11/1204* (2013.01); *B60C 11/1281* (2013.01);
  (Continued)

(58) Field of Classification Search
  CPC ......... B60C 11/0304; B60C 2011/0353; B60C 2011/0381; B60C 11/1204; B60C 2011/0344; B60C 11/1281
  See application file for complete search history.

(56) References Cited

U.S. PATENT DOCUMENTS 3,841,374 A * 10/1974 Boileau ............... B60C 11/0306
  152/209.27
6,250,354 B1 * 6/2001 Kawai ................. B60C 11/0306
  152/209.18
(Continued)

FOREIGN PATENT DOCUMENTS

CA   2018565 A  * 12/1990
JP   06-080002 A  *  3/1994
(Continued)

OTHER PUBLICATIONS

Machine translation for Japan 07-172110 (no date).*
Machine translation for Japan 06-080002 (no date).*

*Primary Examiner* — Steven D Maki
(74) *Attorney, Agent, or Firm* — Birch, Stewart, Kolasch & Birch, LLP

(57) ABSTRACT

A pneumatic tire is provided in a tread portion 2 with shoulder main grooves 3 and 4 and a center main groove 5 and divided into shoulder land portions 6 and 7 and crown land portions 8 and 9. The total width of the shoulder main grooves 3 and 4 and the center main groove 5 is 24% to 28% of the tread width TW. The crown land portions 8 and 9 are not provided with a groove having a width of not less than 2 mm and extending across the entire width of the crown land portion, but provided with a plurality of crown sipes 10 having a width of less than 2 mm. The crown sipes 10 include first sipes 11 comprising a lateral direction part 11$a$ extending parallel with the tire axial direction and an oblique part 11$b$ inclined with respect to the lateral direction part 11$a$. The ratio $\Sigma Ly/\Sigma Ls$ of the sum $\Sigma Ly$ of the lengths Ly of the lateral direction parts 11$a$ and the sum $\Sigma Ls$ of the lengths Ls of the crown sipes 10 is not more than 0.15.

10 Claims, 6 Drawing Sheets

(52) U.S. Cl.
CPC ................ *B60C 2011/0341* (2013.01); *B60C 2011/0344* (2013.01); *B60C 2011/0353* (2013.01); *B60C 2011/0365* (2013.01); *B60C 2011/0381* (2013.01); *B60C 2011/1213* (2013.01)

(56) References Cited

U.S. PATENT DOCUMENTS

| | | | | |
|---|---|---|---|---|
| 6,341,633 | B1* | 1/2002 | Adlon | B60C 11/12 152/209.18 |
| 6,561,242 | B2* | 5/2003 | Chaen | B60C 11/11 152/209.18 |
| 2005/0000613 | A1* | 1/2005 | Maruoka | B60C 11/00 152/209.1 |
| 2011/0297284 | A1* | 12/2011 | Montesello | B60C 11/0304 152/209.8 |
| 2012/0298269 | A1* | 11/2012 | Mathonet | B60C 11/0306 152/209.16 |
| 2014/0090759 | A1* | 4/2014 | Tanaka | B60C 11/0306 152/209.8 |
| 2014/0138000 | A1* | 5/2014 | Inoue | B60C 11/1392 152/209.8 |
| 2014/0283967 | A1* | 9/2014 | Inoue | B60C 11/12 152/209.18 |

FOREIGN PATENT DOCUMENTS

| | | | |
|---|---|---|---|
| JP | 07-172110 A | * | 7/1995 |
| JP | 2013-078984 A | | 5/2013 |

* cited by examiner

PNEUMATIC TIRE

TECHNICAL FIELD

The present invention relates to a pneumatic tire improved in the steering stability on dry road surfaces and wet road surfaces.

BACKGROUND ART

A pneumatic tire improved in drainage performance by employing straight main grooves has been previously known.

For example, in the following Patent document 1, in order to improve drainage performance and noise performance, a pneumatic tire provided in the tread portion with three main grooves and narrow grooves disposed in a vehicle-outside land portion has been proposed.

PRIOR ART DOCUMENT

Patent Document

[Patent document 1] Japanese patent application publication No. 2013-78984

In the pneumatic tire described in the above-mentioned patent document 1, however, there is a possibility that, by the narrow grooves, the vehicle-outside land portion is decreased in the rigidity, and the steering stability on dry road surfaces is decreased.

SUMMARY OF INVENTION

Technical Problem

The present invention was made with the view to the above-mentioned actual circumstances, and a primary object of the present invention is to provide a pneumatic tire in which steering stability on dry road surfaces and steering stability on wet road surfaces can be achieved in high levels.

Solution to Problem

The present invention is a pneumatic tire characterized in that a tread portion is provided with a pair of shoulder main grooves extending continuously in the tire circumferential direction and disposed one on each side of the tire equator in the tire axial direction, and a center main groove extending continuously in the tire circumferential direction and disposed between a pair of the shoulder main grooves so that the tread portion is divided into a pair of crown land portions between the center main groove and the shoulder main grooves and a pair of shoulder land portions axially outside the shoulder main grooves, the sum of the widths of the shoulder main grooves and the width of the center main groove is 24% to 28% of a tread width, in the crown land portions, a groove having a width of not less than 2 mm and extending across the entire width of the crown land portion is not provided, whereas a plurality of crown sipes having a width of less than 2 mm are provided, the crown sipes include first sipes having a lateral direction part extending parallel with the tire axial direction and an oblique part inclined with respect to the lateral direction part, and the ratio $\Sigma Ly/\Sigma Ls$ of the sum $\Sigma Ly$ of lengths Ly of the lateral direction parts and the sum $\Sigma Ls$ of lengths Ls of the crown sipes is not more than 0.15.

In the pneumatic tire according to the present invention, it is preferable that the shoulder main grooves and the center main groove are straight.

In the pneumatic tire according to the present invention, it is preferable that the tread portion is provided with an asymmetrical tread pattern such that the tire has side to be faced outward when the tire is installed on a vehicle and accordingly the tread portion has an outside tread edge to be positioned outward and an inside tread edge to be positioned inward, a pair of the shoulder main grooves are an outside shoulder main groove on the outside tread edge side and an inside shoulder main groove on the inside tread edge side, a pair of the crown land portions are an outside crown land portion between the center main groove and the outside shoulder main groove and an inside crown land portion between the center main groove and the inside shoulder main groove, and the inside crown land portion is provided with the first sipes.

In the pneumatic tire according to the present invention, it is preferable that the width of the outside shoulder main groove is less than the width of the inside shoulder main groove, and less than the width of the center main groove.

In the pneumatic tire according to the present invention, it is preferable that a pair of the shoulder land portions are an outside shoulder land portion between the outside shoulder main groove and the outside tread edge, and an inside shoulder land portion between the inside shoulder main groove and the inside tread edge, and the inside shoulder land portion is provided with inside shoulder axial grooves extending so as to connect between the inside shoulder main groove and the inside tread edge.

In the pneumatic tire according to the present invention, it is preferable that the outside shoulder land portion is provided with outside shoulder rug grooves extending axially inwardly from the outside tread edge and terminating within the outside shoulder land portion.

In the pneumatic tire according to the present invention, it is preferable that the crown sipes include second and third sipes disposed in the outside crown land portion, the second sipe extends to connect between the center main groove and the inside shoulder main groove, and the third sipe extends axially inwardly from the outside shoulder main groove and terminates within the outside crown land portion.

Advantageous Effects of Invention

The pneumatic tire according to the present invention is provided in the tread portion with a pair of the shoulder main grooves and the center main groove, and the tread portion is divided into a pair of the shoulder land portions and a pair of the crown land portions. The sum of the widths of the shoulder main grooves and the width of the center main groove is set to be 24% to 28% of the tread width. Thereby, the pneumatic tire in this embodiment is provided with sufficient drainage performance and the rigid land portions, and excellent steering stability can be obtained in both of wet and dry road conditions.

The crown land portions are not provided with a groove having a width of not less than 2 mm and extending across the entire width of the crown land portion, and are provided with a plurality of the crown sipes having the width of less than 2 mm. Thereby, the crown land portions where the ground pressure is high is increased in the rigidity, and excellent steering stability can be obtained on dry road surfaces.

The crown sipes include the first sipes having the lateral direction part extending parallel with the tire axial direction and the oblique part inclined with respect to the lateral direction part, and the ratio $\Sigma Ly/\Sigma Ls$ of the sum $\Sigma Ly$ of the lengths Ly of the lateral direction parts and the sum $\Sigma Ls$ of the lengths Ls of the crown sipes is not more than 0.15. Thereby, the percentage of the oblique parts in the crown sipes is increased, the axial rigidity of the crown land portion is increased, and the steering stability on dry road surfaces is improved.

DESCRIPTION OF EMBODIMENTS

Embodiments of the present invention will now be described in detail in conjunction with the accompanying drawings.

Figure 1:
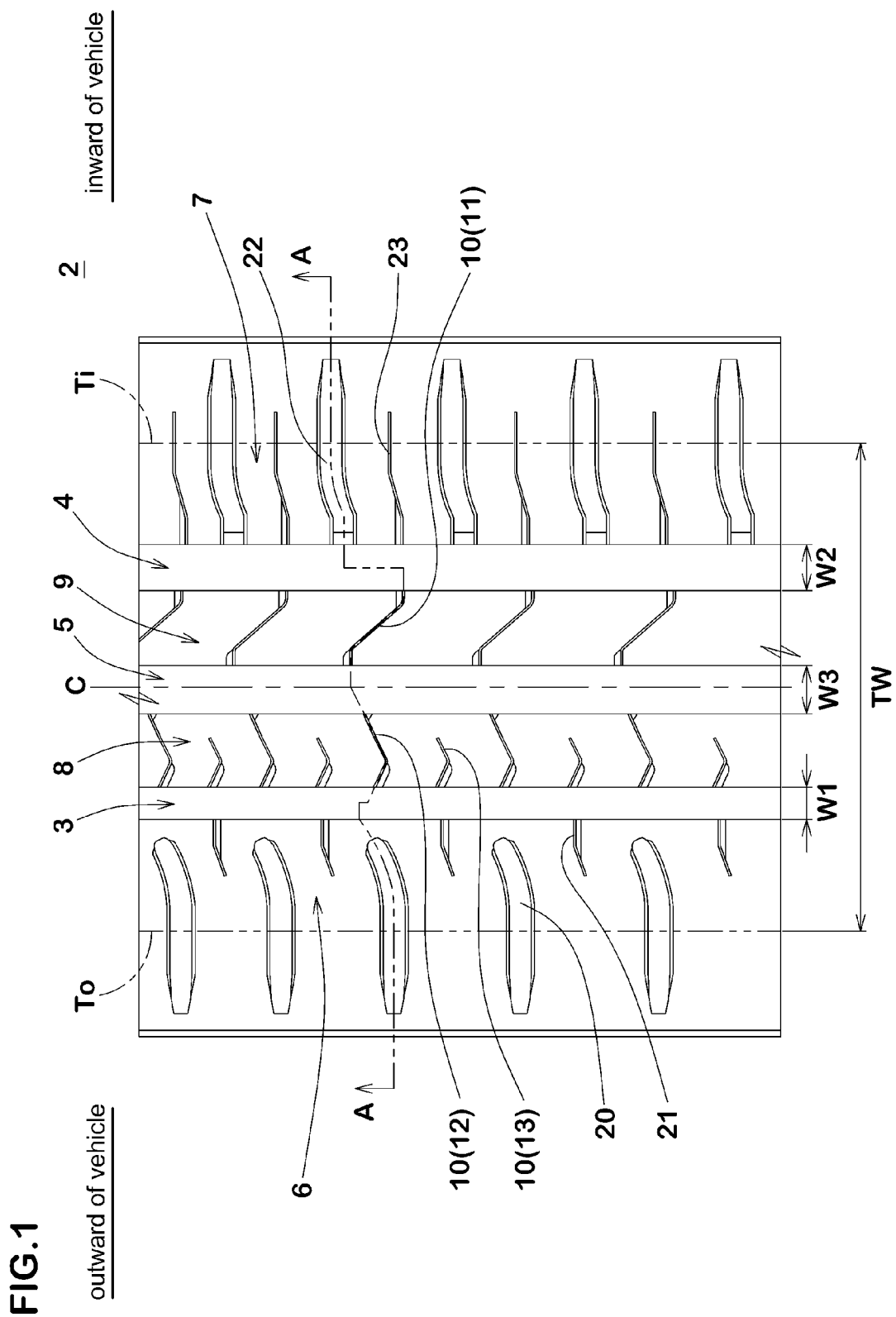
FIG. 1 is a developed plan view of the tread portion of a pneumatic tire as an embodiment of the present invention.
Figure 2:
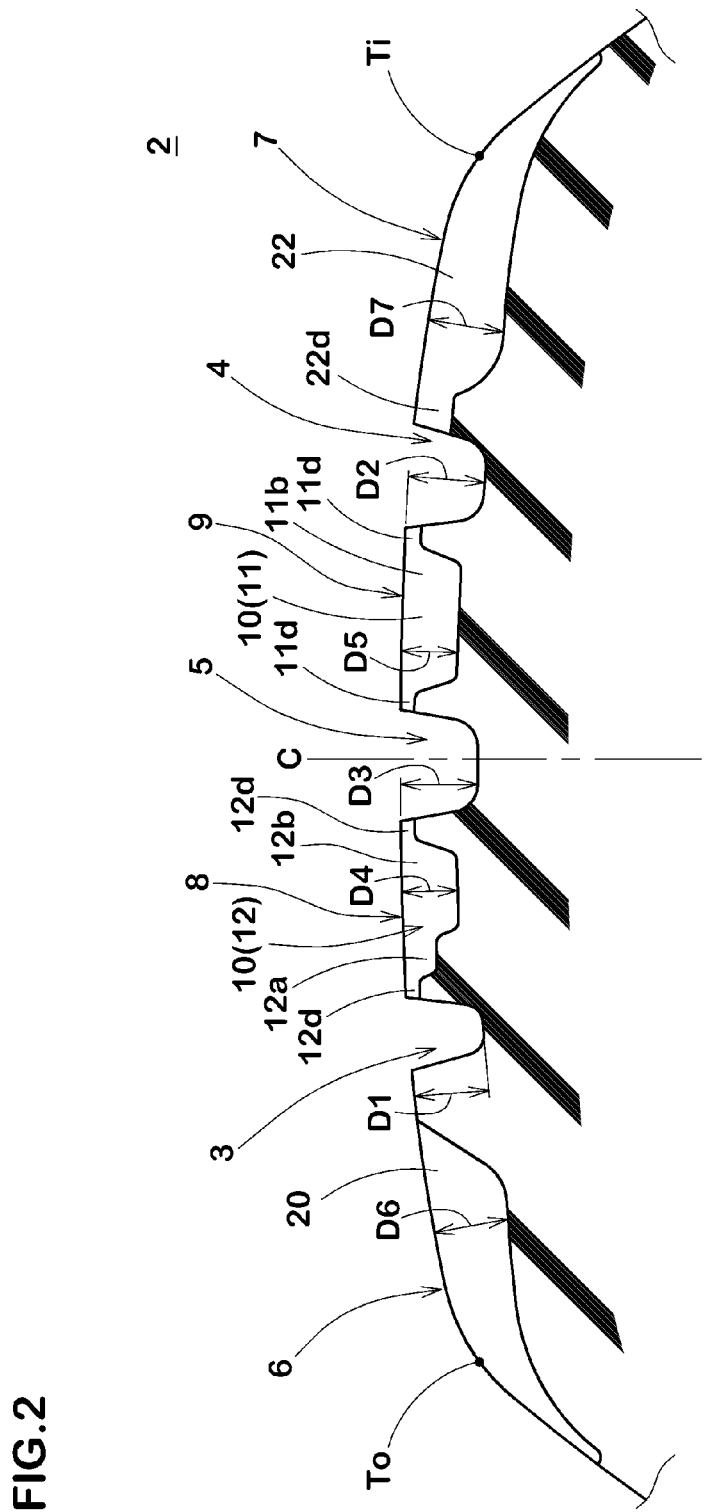
FIG. 2 is a cross sectional view of the tread portion taken along line A-A of FIG. 1.

FIG. 1 is a developed plan view of a part of a tread portion 2 of a pneumatic tire in this embodiment. FIG. 2 is a cross sectional view of the tread portion 2 taken along line A-A of FIG. 1.

As shown in FIG. 1, the pneumatic tire in this embodiment is suitably utilized as a passenger pneumatic tire for example, and provided with an asymmetrical tread pattern. The tire has side to be faced outward when installed on a vehicle. Thus, the tread portion 2 has an outside tread edge To to be positioned outward and an inside tread edge Ti to be positioned inward with respect to the vehicle.
Incidentally, the side to be faced outward is indicated in a tire sidewall portion (not shown) by the use of characters "outside", "this side out" or the like.

The tread portion 2 of the tire in this embodiment is provided with: an outside shoulder main groove 3 continuously extending in the tire circumferential direction and disposed on the outside tread edge side of the tire equator C; an inside shoulder main groove 4 continuously extending in the tire circumferential direction and disposed on the inside tread edge side of the tire equator C; and a center main groove 5 continuously extending in the tire circumferential direction and disposed between the outside shoulder main groove 3 and the inside shoulder main groove 4.

Thereby, the tread portion 2 is divided into: an outside shoulder land portion 6 between the outside shoulder main groove 3 and the outside tread edge To; an inside shoulder land portion 7 between the inside shoulder main groove 4 and the inside tread edge Ti; an outside crown land portion 8 between the center main groove 5 and the outside shoulder main groove 3; and an inside crown land portion 9 between the center main groove 5 and the inside shoulder main groove 4.

The above-mentioned tread edges To and Ti are the axially outermost ground contacting positions of the tire 1 under a normal state which tire is load with a standard load and grounded on a flat surface at a camber angle of zero degree.

The "normal state" is such a state that the tire is mounted on a standard wheel rim (not shown), inflated to a normal inner pressure, and loaded with no tire load.
The tread width Tw is defined by the axial distance between the tread edges To and Ti under the normal state.
Dimensions and the like of various tire portions refer to values measured under the normal state unless otherwise noted.

The "standard wheel rim" is a wheel rim specified for the tire by a standard included in a standardization system on which the tire is based, for example, the "normal wheel rim" in JATMA, "Design Rim" in TRA, and "Measuring Rim" in ETRTO.

The "normal inner pressure" is air pressure specified for the tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO. In the case of a passenger car tire, the normal inner pressure is 180 kPa.

The "standard load" is a load specified for the tire by a standard included in a standardization system on which the tire is based, for example, the "maximum load capacity" in JATMA, maximum value listed in "TIRE LOAD LIMITS AT VARIOUS COLD INFLATION PRESSURES" table in TRA, and "LOAD CAPACITY" in ETRTO. In the case of a passenger car tire, the "standard load" is 88% of the above-mentioned load.

Each of the outside shoulder main groove 3, the inside shoulder main groove 4 and the center main groove 5 is a straight groove. Such main grooves 3, 4 and 5 are advantageous to the drainage performance and improve the wet performance of the pneumatic tire.

The sum w1+w2+w3 of the width w1 of the outside shoulder main groove 3, the width w2 of the inside shoulder main groove 4 and the width w3 of the center main groove 5 is preferably set in a range of from 24% to 28% of the tread width TW.

If the sum w1+w2+w3 is less than 24% of the tread width TW, there is a possibility that the drainage performance is deteriorated and the wet performance is adversely affected. If the sum w1+w2+w3 exceeds 28% of the tread width TW, there is a possibility that the ground contacting area of the tread portion 2 becomes insufficient and the steering stability is deteriorated. Further, there is a possibility that the rigidity of the tread portion 2 is decreased, and the steering stability is adversely affected.

It is preferable that the width w1 of the outside shoulder main groove 3 is less than the width w2 of the inside shoulder main groove 4 and less than the width w3 of the center main groove 5. Such outside shoulder main groove 3 increases the rigidity of an outside tread edge side of the tread portion 2 subjected to a large side force during cornering and improves the steering stability on dry road surfaces.

The width w1 of the outside shoulder main groove 3 may be the same as the width w2 of the inside shoulder main groove 4. In this case, the shoulder main grooves 3 and 4 and the center main groove 5 may be arranged symmetrically about the tire equator C.

It is preferable that the width w3 of the center main groove 5 is more than the width w2 of the inside shoulder main groove 4. Such center main groove 5 increases the drainage performance of the tread portion 2 in the vicinity of the tire equator C where the ground pressure becomes high, and improves the wet performance.

The depths D1, D2 and D3 of the outside shoulder main groove 3, the inside shoulder main groove 4 and the center main groove 5 shown in FIG. 2 may be defined in accordance with customary practice. In the case of the passenger tires as in this embodiment, it is preferable that the depths D1-D3 of the main grooves 3-5 are set in a range of from 5 to 10 mm.

If the depths D1-D3 of the main grooves 3-5 are less than 5 mm, there is a possibility that the drainage performance is deteriorated, and the wet performance is adversely affected. If the depths D1-D3 of the main grooves 3-5 exceed 10 mm, there is a possibility that the rigidity of the tread portion 2 decreases and the steering stability is adversely affected.

The entire width of each of the outside crown land portion 8 and the inside crown land portion 9 is not crossed by a groove whose width is not less than 2 mm. Thereby, the outside crown land portion 8 and the inside crown land portion 9 where the ground pressure is high is increased in the rigidity, and an excellent steering stability can be obtained on dry road surfaces.

The outside crown land portion 8 and the inside crown land portion 9 are provided with a plurality of crown sipes 10. The crown sipes 10 exert their edge effect and improve the wet performance of the pneumatic tire. Further, owing to the crown sipes 10, the rigidity of the outside crown land portion 8 and the inside crown land portion 9 is optimized, and it becomes possible to improve the ride comfort performance while maintaining the above-mentioned excellent steering stability on dry road surfaces.

Figure 3:
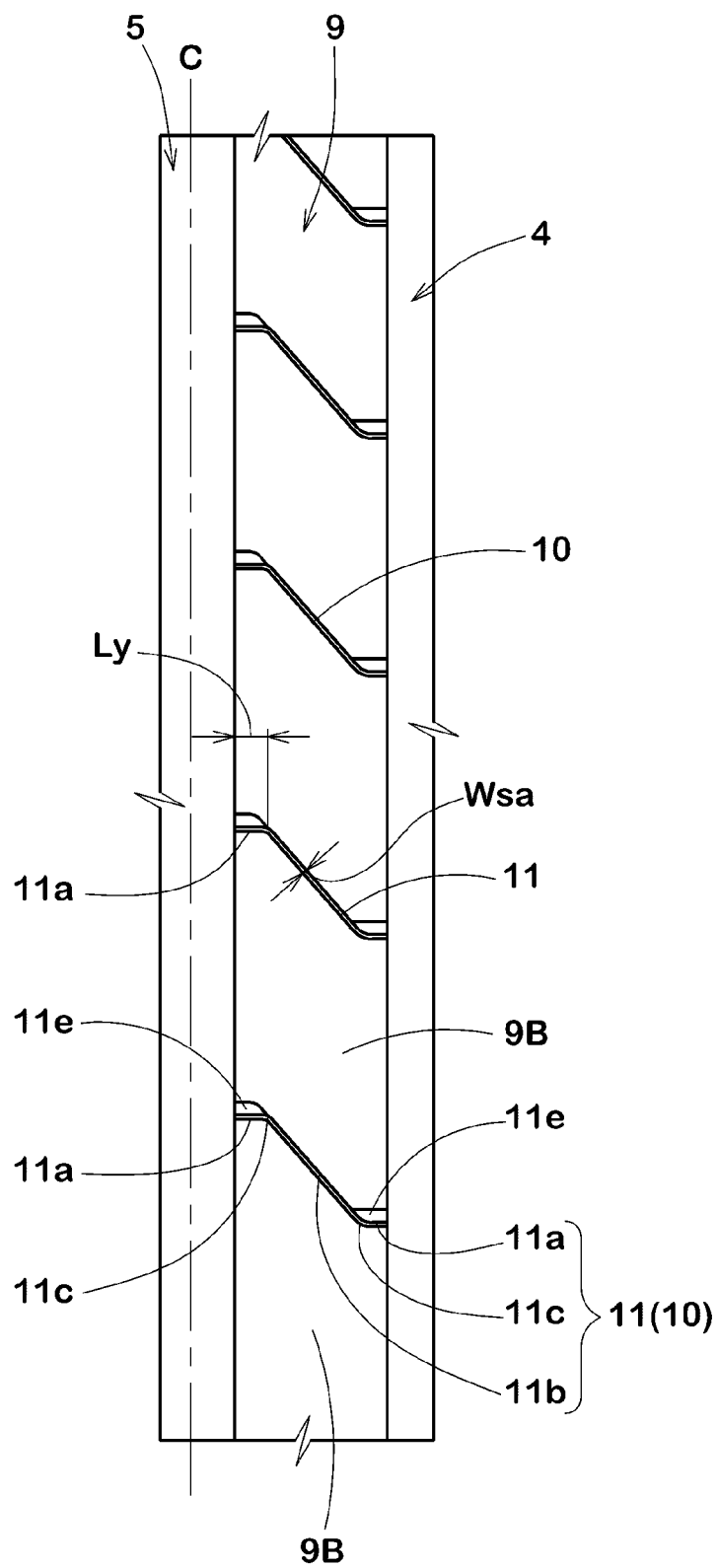
FIG. 3 is an enlarged developed plan view of the inside crown land portion of the tread portion shown in FIG. 1.

FIG. 3 shows the inside crown land portion 9.
The inside crown land portion 9 is provided with a plurality of first sipes 11 extending between the inside shoulder main groove 4 and the center main groove 5. That is, the above-mentioned crown sipes 10 include the first sipes 11. By the first sipes 11, the inside crown land portion 9 is divided into a plurality of block-like inside crown parts 9B.

The width wsa of the first sipe 11 is preferably less than 2 mm, for example. Such first sipes 11 improve the ride comfort performance, while maintaining the excellent steering stability on dry road surfaces.

The first sipes 11 may be provided in the outside crown land portion 8. In this case, the first sipes 11 extend between the outside shoulder main groove 3 and the center main groove 5.

As shown in FIG. 3, each of the first sipes 11 comprises: a pair of lateral direction parts 11a extending parallel with the tire axial direction; a first oblique part 11b inclined with respect to the lateral direction parts 11a; and a pair of first bent parts 11c between the lateral direction parts 11a and the first oblique part 11b.

The lateral direction parts 11a are formed at both axial ends of the first sipe 11. Each of the lateral direction parts 11a is connected to the inside shoulder main groove 4 or the center main groove 5. As the first sipe 11 is provided with the lateral direction parts 11a, the first sipe 11 becomes orthogonal to the inside shoulder main groove 4 and the center main groove 5. Such first sipes 11 mitigate stress concentration on the corners of the block-like inside crown part 9B and prevent damage such as chipping-off.

The first oblique part 11b connects between a pair of the lateral direction parts 11a through the first bent parts 11c. The first oblique part 11b provided in the first sipe 11 closes during cornering when the inside crown land portion 9 is subjected to a large side force. Thereby, the block-like inside crown parts 9B adjacent to each other in the tire circumferential direction can support each other, and as a result, the inside crown land portion 9 or the tread portion 2 is increased in the lateral rigidity.

Also, the first oblique part 11b closes during braking, namely, when the inside crown land portion 9 is subjected to a large force in the front-back direction. Thereby, the block-like inside crown parts 9B adjacent to each other in the tire circumferential direction can support each other, and as a result, the rigidity of the inside crown land portion 9 in the tire circumferential direction is increased.

Thus, the steering stability on dry road surfaces is improved.

It is preferable that the ratio $\Sigma Ly/\Sigma Ls$ of the sum $\Sigma Ly$ of the lengths Ly of the lateral direction parts 11a to the sum $\Sigma Ls$ of the lengths Ls of the crown sipes 10 is not more than 0.15. If the ratio $\Sigma Ly/\Sigma Ls$ exceeds 0.15, the percentage of the length of the first oblique part 11b in the crown sipe 10 becomes insufficient, and the improvement in the lateral rigidity of the tread portion 2 during cornering is limited.

It is preferable that, as shown in FIG. 2, the depth D5 of the first oblique part 11b of the first sipe 11 is 50% to 90% of the depth D3 of the center main groove 5.

If the depth D5 of the first oblique part 11b is less than 50% of the depth D3 of the center main groove 5, there is a possibility that the rigidity of the inside crown land portion 9 is excessively increased, and the ride comfort performance is deteriorated. If the depth D5 of the first oblique part 11b exceeds 90% of the depth D3 of the center main groove 5, there is a possibility that the rigidity of the inside crown land portion 9 is decreased, and the excellent steering stability on dry road surfaces is adversely affected.

The first sipe 11 is formed such that the depth becomes decreased in both end portions 11d, 11d. In other words, the depth of the lateral direction parts 11a shown in FIG. 3 is less than the depth of the first oblique part 11b.

Owing to such first sipe 11, the rigidity distribution in the inside crown land portion 9 is optimized, and the steering stability and the ride comfort performance are improved in a well balanced manner.

As shown in FIG. 3, a chamfered part 11e is formed in the vicinity of each end portion of the first sipe 11.

The chamfered parts 11e are formed at ends of the block-like inside crown parts 9B which ends are on one side of the respective first sipes 11 in the tire circumferential direction.

As the inside crown land portion 9 is provided with the chamfered parts 11e, the actual ground contacting area of the inside crown land portion 9 is decreased, and the ground pressure of the inside crown land portion 9 is increased. Thereby, so called aquaplaning phenomenon is suppressed, and the wet performance during especially high speed running is improved. Further, the chamfered parts 11e mitigate stress concentration on the corners of the block-like inside crown parts 9B, and prevent damage such as chipping-off.

Each of the chamfered parts 11e is limited to the vicinity of one of the ends of the first sipes 11, and does not extend over the entire width of the inside crown land portion 9. Accordingly, the above-mentioned good balance between the steering stability and the ride comfort performance is maintained.

Figure 4:
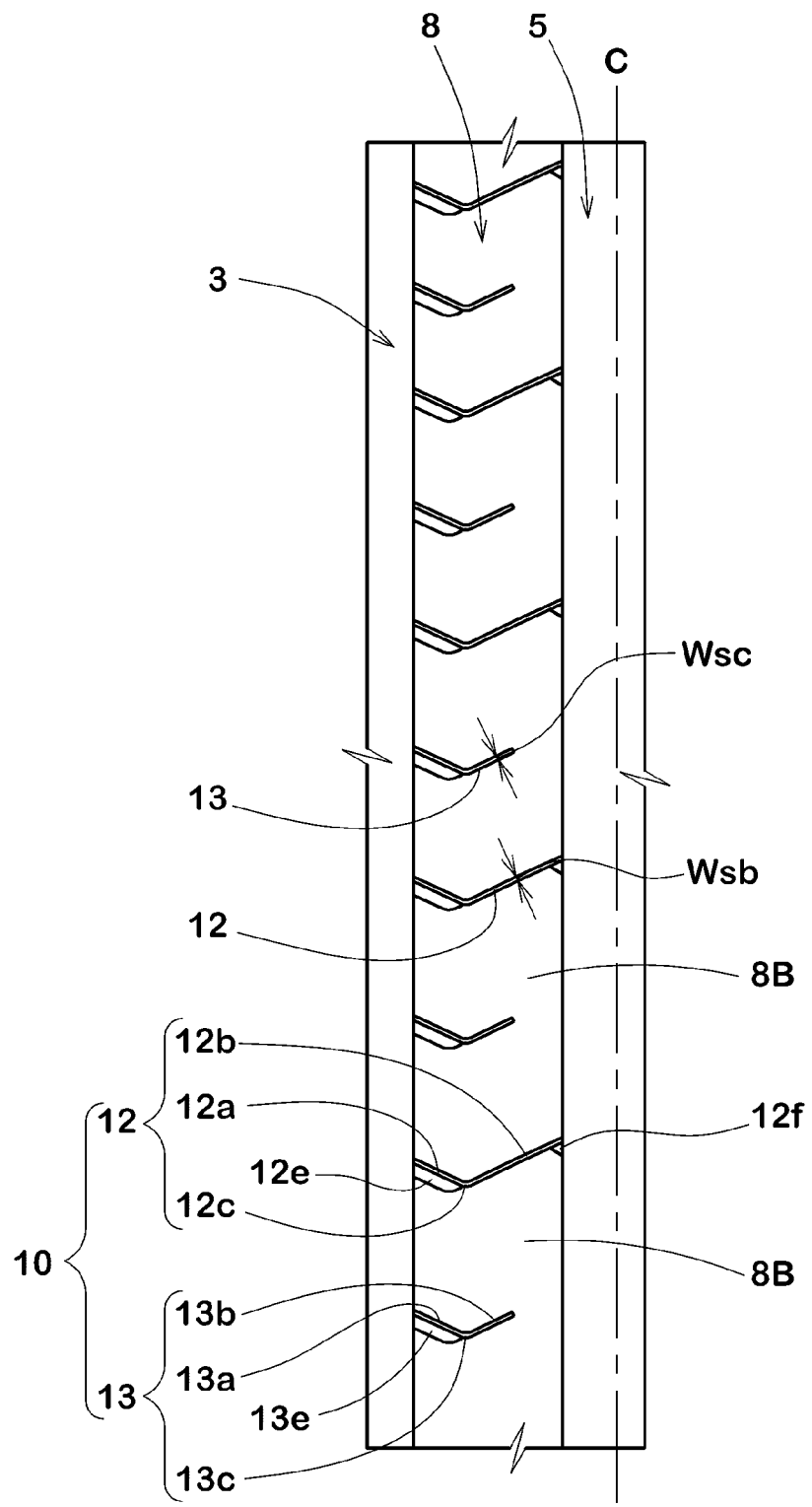
FIG. 4 is an enlarged developed plan view of the outside crown land portion of the tread portion shown in FIG. 1.

FIG. 4 shows the outside crown land portion 8.

The outside crown land portion 8 is provided with a plurality of second sipes 12 extending between the outside shoulder main groove 3 and the center main groove 5, and a plurality of third sipes 13 extending axially inwardly from the outside shoulder main groove 3 and terminating within the outside crown land portion 8. That is, the above-mentioned crown sipes 10 include the second sipes 12 and the third sipes 13. By the second sipes 12, the outside crown land portion 8 is divided into a plurality of block-like outside crown parts 8B.

The width wsb of the second sipe 12 is less than 2 mm, for example. It is preferable that the width wsc of the third sipe 13 is also less than 2 mm, for example.
Such second sipes 12 and third sipes 13 can improve the ride comfort performance, while maintaining the excellent steering stability on dry road surfaces.

Optionally, the second sipes 12 and the third sipes 13 may be provided in the inside crown land portion 9.

The second sipe 12 comprises: a second oblique part 12a inclined with respect to the tire axial direction toward one side thereof; a third oblique part 12b inclined with respect to the tire axial direction toward the other side thereof; and a second bent part 12c between the second oblique part 12a and the third oblique part 12b.

The second oblique part 12a is connected to the outside shoulder main groove 3. The second oblique part 12a in this embodiment is inclined to the same direction as the first oblique part 11b.

The third oblique part 12b is connected to the center main groove 5.

The second bent part 12c connects between the second oblique part 12a and the third oblique part 12b.

The second oblique part 12a and the third oblique part 12b provided in the second sipe 12 close during cornering when the outside crown land portion 8 is subjected to a large side force. Thereby, the block-like outside crown parts 8B adjacent to each other in the tire circumferential direction support each other, and the outside crown land portion 8 or the tread portion 2 is increased in the lateral rigidity.
In this embodiment, since the above-mentioned lateral direction parts 11a are not formed in the outside crown land portion 8 to which the load is shifted during cornering, the lateral rigidity of the outside crown land portion 8 is further increased. Further, the second oblique part 12a and the third oblique part 12b close during braking, namely, when the outside crown land portion 8 is subjected to a large force in the front-back direction. Thereby, the block-like outside crown parts 8B adjacent to each other in the tire circumferential direction support each other, and the rigidity in the tire circumferential direction of the outside crown land portion 8 is increased. Thus, the steering stability on dry road surfaces is improved.

It is preferable that, as shown in FIG. 2, the depth D4 of the third oblique part 12b of the second sipe 12 is 50% to 90% of the depth D3 of the center main groove 5.
If the depth D5 of the third oblique part 12b is less than 50% of the depth D3 of the center main groove 5, there is a possibility that the rigidity of the outside crown land portion 8 is excessively increased, and the ride comfort performance is deteriorated. If the depth D5 of the third oblique part 12b exceeds 90% of the depth D3 of the center main groove 5, there is a possibility that the rigidity of the outside crown land portion 8 is decreased, and the excellent steering stability on dry road surfaces is adversely affected.

The second sipe 12 is formed such that its depth becomes smaller in its outside tread edge To side. That is, the depth of the second oblique part 12a is less than the depth of the third oblique part 12b. Owing to such second sipes 12, a decrease in the rigidity in an outside tread edge To side of the outside crown land portion 8 can be suppressed, and the steering stability on dry road surfaces is improved.

The second sipe 12 is formed such that its depth becomes smaller in its both end portions 12d. Owing to such second sipe 12, the rigidity distribution in the outside crown land portion 8 is optimized, and the steering stability and the ride comfort performance are improved in a well balanced manner.

As shown in FIG. 4, chamfered parts 12e, 12f are formed in the vicinities of both ends of each second sipe 12.
The chamfered parts 12e, 12f are formed on acute-angled corners of each block-like outside crown part 8B at its one end on one side of the second sipe 12 in the tire circumferential direction. As the outside crown land portion 8 is provided with the chamfered parts 12e, 12f, the actual ground contacting area of the outside crown land portion 8 is decreased, and the ground pressure of the outside crown land portion 8 is increased. Thereby, so called aquaplaning phenomenon is suppressed, and the wet performance during especially high speed running is improved. Further, the chamfered parts 12e, 12f mitigate stress concentration on the corners of the block-like outside crown parts 8B, and prevent damage such as chipping-off.

The third sipe 13 comprises: a fourth oblique part 13a inclined with respect to the tire axial direction toward one side thereof; a fifth oblique part 13b with respect to the tire axial direction toward the other side thereof; and a third bent part 13c between the fourth oblique part 13a and the fifth oblique part 13b.

The fourth oblique part 13a is connected to the outside shoulder main groove 3.
The fifth oblique part 13b terminates within the outside crown land portion 8.
The third bent part 13c connects between the fourth oblique part 13a and the fifth oblique part 13b.

The fourth oblique part 13a and the fifth oblique part 13b provided in the third sipe 13 close during cornering when the outside crown land portion 8 is subjected to a large side force. Thereby, in cooperation with the above-mentioned second sipes 12, the outside crown land portion 8 or the tread portion 2 is increased in the lateral rigidity.
Further, the fourth oblique part 13a and the fifth oblique part 13b close during braking when the outside crown land portion 8 is subjected to a large force in the front-back direction, and the rigidity in the tire circumferential direction of the outside crown land portion 8 is increased.
Thereby, the steering stability on dry road surfaces is improved.

It is preferable that the depth (not shown) of the fifth oblique part 13b of the third sipe 13 is 50% to 90% of the depth D3 of the center main groove 5.
If the depth of the fifth oblique part 13b is less than 50% the depth D3 of the center main groove 5, there is a possibility that the rigidity of the outside crown land portion 8 is excessively increased, and the ride comfort performance is deteriorated. If the depth of the fifth oblique part 13b exceeds 90% of the depth D3 of the center main groove 5, there is a possibility that the rigidity of the outside crown land portion 8 is decreased, and the excellent steering stability on dry road surfaces is adversely affected.

The third sipe 13 is formed such that the depth becomes smaller in its end portion on the outside tread edge side.

By such third sipe 13, the rigidity distribution in the outside crown land portion 8 is optimized, and the steering stability and the ride comfort performance are improved in a well balanced manner.

As shown in FIG. 4, a chamfered part 13e is formed in the vicinity of one end of each third sipe 13 on the outside tread edge side. The chamfered part 13e is formed at an end on one side in the tire circumferential direction of the third sipe 13, that is, an acute-angled corner of the block-like outside crown part 8B.

As the outside crown land portion 8 is provided with the chamfered parts 13e, the actual ground contacting area of the outside crown land portion 8 is further decreased, and the ground pressure of the outside crown land portion 8 is increased. Thereby, so called aquaplaning phenomenon is suppressed, and the wet performance during especially high speed running is improved. Further, the chamfered parts 13e mitigate stress concentration in the vicinities of the fourth oblique parts 13a, and prevent damage such as chipping-off.

Figure 5:
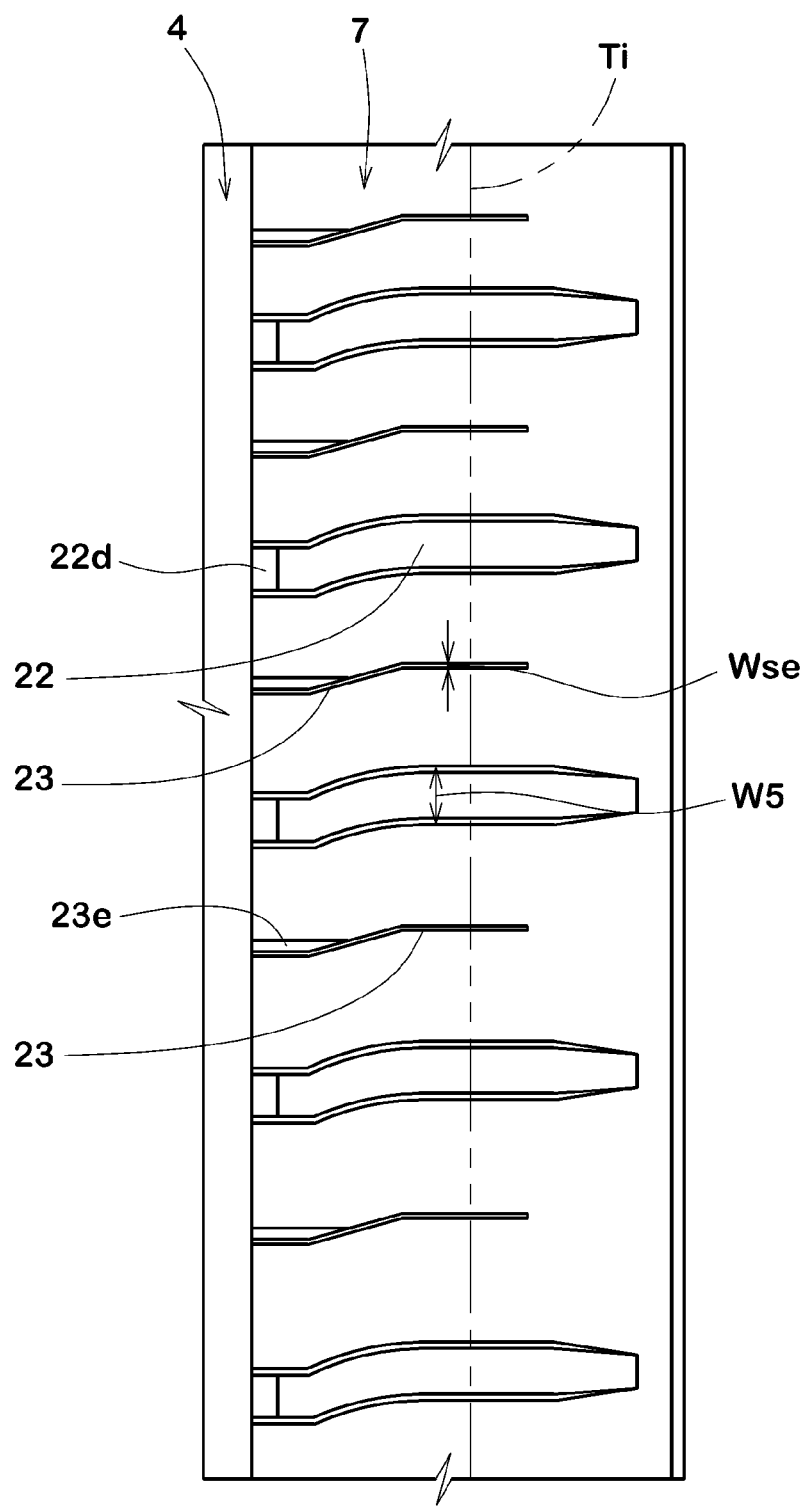
FIG. 5 is an enlarged developed plan view of the inside shoulder land portion of the tread portion shown in FIG. 1.

FIG. 5 shows the inside shoulder land portion 7. The inside shoulder land portion 7 is provided with inside shoulder axial grooves 22 and inside shoulder sipes 23.

The inside shoulder axial grooves 22 extend in the tire axial direction to connect between the inside tread edge Ti and the inside shoulder main groove 4.

The width w5 of the inside shoulder axial groove 22 is set in a range of from 4% to 8% of the tread width Tw, for example. By the inside shoulder axial grooves 22 connected to the inside shoulder main groove 4, the drainage performance of the inside shoulder land portion 7 is increased, and the wet performance is improved.

It is preferable that, as shown in FIG. 2, the depth D7 of the inside shoulder axial groove 22 is not more than 100% of the depth D4 of the inside shoulder main groove 4, for example. The inside shoulder axial groove 22 is formed such that the depth becomes smaller in its end portion 22d on the outside tread edge side. By such inside shoulder axial grooves 22, the rigidity of the inside shoulder land portion 7 is increased in an axially inside thereof, and the steering stability on dry road surfaces is improved.

The inside shoulder sipe 23 extends in the tire axial direction to connect between the inside tread edge Ti and the inside shoulder main groove 4.

It is preferable that the width wse of the inside shoulder sipe 23 is less than 2 mm, for example.

Such inside shoulder sipes 23 exert their edge effect, and can improve the wet performance of the pneumatic tire.

Further, by the inside shoulder sipes 23, the rigidity distribution in the inside shoulder land portion 7 is optimized, and the ride comfort performance is improved.

As shown in FIG. 5, a chamfered part 23e is formed in the vicinity of one end of each inside shoulder sipe 23 on the outside tread edge side.

The chamfered part 23e is formed at an end on one side of the inside shoulder sipe 23 in the tire circumferential direction. As the inside shoulder land portion 7 is provided with the chamfered parts 23e, the actual ground contacting area of the inside shoulder land portion 7 is further decreased, and the ground pressure of the inside shoulder land portion 7 is increased. Thereby, so called aquaplaning phenomenon is suppressed, and the wet performance during especially high speed running is improved.

Figure 6:
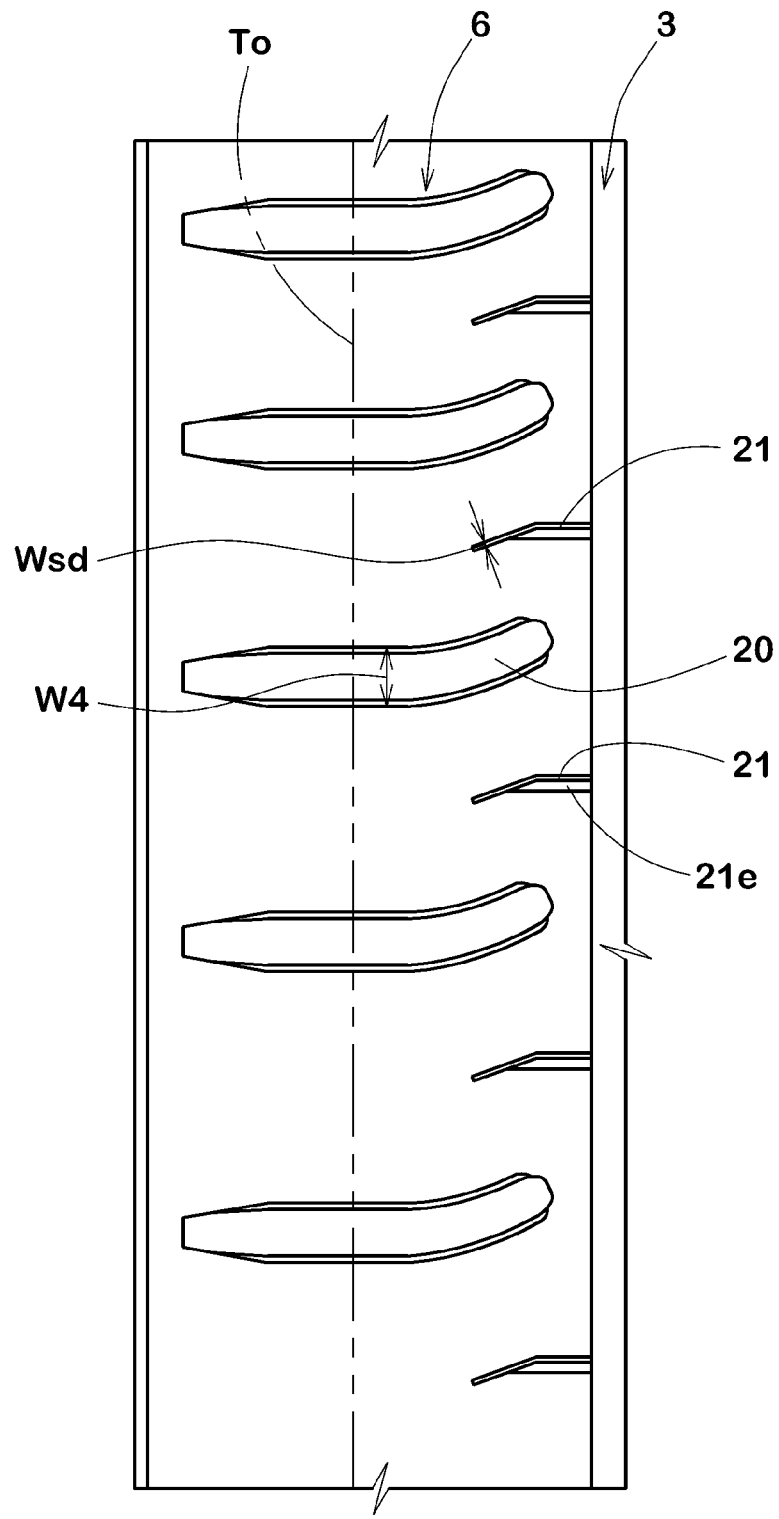
FIG. 6 is an enlarged developed plan view of the outside shoulder land portion of the tread portion shown in FIG. 1.

FIG. 6 shows the outside shoulder land portion 6. The outside shoulder land portion 6 is provided with outside shoulder rug grooves 20 and outside shoulder sipes 21.

The outside shoulder rug grooves 20 extend axially inwardly from the outside tread edge To and terminate within the outside shoulder land portion 6.

It is preferable that the width w4 of the outside shoulder rug groove 20 is 4% to 8% of the tread width TW, for example.

By the outside shoulder rug grooves 20, the drainage performance of the outside shoulder land portion 6 is increased, and the wet performance is improved.

Further, as the outside shoulder rug grooves 20 terminate within the outside shoulder land portion 6, the outside shoulder land portion 6 is continuous in the tire circumferential direction. Thereby, the outside shoulder land portion 6 which is subjected to a large side force during cornering is increased in the rigidity, and the steering stability on dry road surfaces is improved.

The outside shoulder sipes 21 extend axially outwardly from the outside shoulder main groove 3 and terminate within the outside shoulder land portion 6.

It is preferable that the width wsd of the outside shoulder sipe 21 is less than 2 mm, for example.

By the outside shoulder sipes 21, the rigidity distribution in the outside shoulder land portion 6 is optimized, and the ride comfort performance is improved.

Further, as the outside shoulder sipes 21 terminate within the outside shoulder land portion 6, the outside shoulder land portion 6 is continuous in the tire circumferential direction. Thereby, the rigidity of the outside shoulder land portion 6 which is subjected to a large side force during cornering is increased, and the steering stability on dry road surfaces is improved.

While description has been made of the pneumatic tire of the present invention, the illustrated embodiment should not be construed as to limit the scope of the present invention; various modifications are possible without departing from the scope of the present invention.

Comparison Tests

Pneumatic tires of size 175/65R14 having the basic tread pattern shown in FIG. 1 were experimentally manufactured according to specifications listed in Table 1, and tested for the drainage performance on wet road and the steering stability on dry road.

The test methods were as follows.

<Drainage Performance>

The test tire mounted on a 14×5J wheel rim was installed on each wheel of a passenger car.

On a wet road surface in a tire test course, the lateral acceleration during cornering was measured, and the resistance to lateral aquaplaning was evaluated. Further, the longitudinal acceleration during straight running was measured, and the resistance to longitudinal aquaplaning was evaluated. The results are indicated by an index based on comparative example 1 being 100, wherein the larger the value, the better the drainage performance.

<Steering Stability>

Running the test car on a dry asphalt road surface in the tire test course, characteristics relating to the steering responsiveness and road grip were evaluated by the driver's feelings. The results are indicated by an index based on Embodiment 1 being 100, wherein the larger the value, the better the steering stability.

TABLE 1

| Tire | Ex. 1 | Ex. 2 | Ex. 3 | Ex. 4 | Ref. 1 | Ref. 2 | Ref. 3 | Ref. 4 | Ref. 5 |
|---|---|---|---|---|---|---|---|---|---|
| (W1 + W2 + W3)/TW (%) | 26 | 24 | 28 | 26 | 22 | 30 | 26 | 26 | 26 |
| whether the entire width of each crown land portion was crossed by a groove having a width of not less than 2 mm | no | no | no | no | no | no | yes | no | no |
| whether the first sipes were provided | yes | yes | yes | yes | yes | yes | yes | no | yes |
| $\Sigma Ly/\Sigma Ls$ | 0.10 | 0.10 | 0.10 | 0.15 | 0.10 | 0.10 | 0.10 | — | 0.20 |
| drainage performance | 100 | 90 | 110 | 100 | 75 | 110 | 105 | 95 | 100 |
| steering stability | 100 | 110 | 90 | 95 | 110 | 75 | 80 | 95 | 90 |

As apparent from Table 1, it was confirmed that the Embodiment tires (Ex.1-Ex.4) were significantly improved in the drainage performance and the steering stability in comparison with comparative examples (Ref.1-Ref.5).

REFERENCE SIGNS LIST 2 tread portion
3 outside shoulder main groove
4 inside shoulder main groove
5 center main groove
6 outside shoulder land portion
7 inside shoulder land portion
8 outside crown land portion
9 inside crown land portion
10 crown sipe
11 first sipe
11a lateral direction part
11b oblique part
12 second sipe
13 third sipe

The invention claimed is:

1. A pneumatic tire comprising:
a tread portion provided with an asymmetrical tread pattern such that the tire has a side to be faced outward when the tire is installed on a vehicle and thereby the tread portion has an outside tread edge to be positioned outward and an inside tread edge to be positioned inward,
the tread portion being provided with a pair of shoulder main grooves extending continuously in the tire circumferential direction and disposed one on each side of the tire equator, the pair of the shoulder main grooves being an outside shoulder main groove on the outside tread edge side and an inside shoulder main groove on the inside tread edge side, and
a center main groove extending continuously in the tire circumferential direction and disposed between a pair of the shoulder main grooves so that the tread portion is divided into a pair of crown land portions between the center main groove and the shoulder main grooves and a pair of shoulder land portions axially outside the shoulder main grooves, the a pair of the crown land portions being an outside crown land portion between the center main groove and the outside shoulder main groove, and an inside crown land portion between the center main groove and the inside shoulder main groove,
wherein
the sum of the widths of the shoulder main grooves and the width of the center main groove is 24% to 28% of a tread width,
in the crown land portions, a groove having a width of not less than 2 mm and extending across the entire width of the crown land portion is not provided, whereas a plurality of crown sipes having a width of less than 2 mm are provided,
the crown sipes include first sipes having a lateral direction part extending parallel with the tire axial direction and an oblique part inclined with respect to the lateral direction part, said first sipes being provided in the inside crown land portion, and
the ratio $\Sigma Ly/\Sigma Ls$ of the sum $\Sigma Ly$ of lengths Ly of the lateral direction parts and the sum $\Sigma Ls$ of lengths Ls of the crown sipes is not more than 0.15.

2. The pneumatic tire according to claim 1, wherein the outside and inside shoulder main grooves and the center main groove are straight.

3. The pneumatic tire according to claim 1, wherein the width of the outside shoulder main groove is less than the width of the inside shoulder main groove, and less than the width of the center main groove.

4. The pneumatic tire according to claim 3, wherein a pair of the shoulder land portions are an outside shoulder land portion between the outside shoulder main groove and the outside tread edge, and an inside shoulder land portion between the inside shoulder main groove and the inside tread edge, and
the inside shoulder land portion is provided with inside shoulder axial grooves extending to connect between the inside shoulder main groove and the inside tread edge.

5. The pneumatic tire according to claim 3, wherein the crown sipes include second and third sipes disposed in the outside crown land portion,
the second sipe extends to connect between the center main groove and the inside shoulder main groove, and
the third sipe extends axially inwardly from the outside shoulder main groove and terminates within the outside crown land portion.

6. The pneumatic tire according to claim 1, wherein a pair of the shoulder land portions are an outside shoulder land portion between the outside shoulder main groove and the outside tread edge, and an inside shoulder land portion between the inside shoulder main groove and the inside tread edge, and
the inside shoulder land portion is provided with inside shoulder axial grooves extending to connect between the inside shoulder main groove and the inside tread edge.

7. The pneumatic tire according to claim 6, wherein the outside shoulder land portion is provided with outside shoulder lug grooves extending axially inwardly from the outside tread edge and terminating within the outside shoulder land portion.

8. The pneumatic tire according to claim 7, wherein the crown sipes include second and third sipes disposed in the outside crown land portion, the second sipe extends to connect between the center main groove and the inside shoulder main groove, and the third sipe extends axially inwardly from the outside shoulder main groove and terminates within the outside crown land portion.

9. The pneumatic tire according to claim 6, wherein the crown sipes include second and third sipes disposed in the outside crown land portion, the second sipe extends to connect between the center main groove and the inside shoulder main groove, and the third sipe extends axially inwardly from the outside shoulder main groove and terminates within the outside crown land portion.

10. The pneumatic tire according to claim 1, wherein the crown sipes include second and third sipes disposed in the outside crown land portion, the second sipe extends to connect between the center main groove and the inside shoulder main groove, and the third sipe extends axially inwardly from the outside shoulder main groove and terminates within the outside crown land portion.

* * * * *